United States Patent
Hrebicek et al.

(10) Patent No.: US 10,235,331 B1
(45) Date of Patent: Mar. 19, 2019

(54) EVENT-BASED SYNCHRONIZATION IN A FILE SHARING ENVIRONMENT

(71) Applicant: EMC IP Holding Company LLC, Hopkinton, MA (US)

(72) Inventors: Ondrej Hrebicek, San Carlos, CA (US); Srin Kumar, Sunnyvale, CA (US); Eric Lee, Union City, CA (US); Ashwani Verma, Pleasanton, CA (US); Andrew Rondeau, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 218 days.

(21) Appl. No.: 14/743,306

(22) Filed: Jun. 18, 2015

(51) Int. Cl.
| | | |
|---|---|---|
| *G06F 17/30* | (2006.01) | |
| *G06F 16/178* | (2019.01) | |
| *H04L 29/08* | (2006.01) | |
| *G06F 16/14* | (2019.01) | |

(52) U.S. Cl.
CPC .......... *G06F 16/178* (2019.01); *G06F 16/148* (2019.01); *G06F 17/30106* (2013.01); *G06F 17/30174* (2013.01); *H04L 67/1095* (2013.01)

(58) Field of Classification Search
CPC combination set(s) only.
See application file for complete search history.

(56) References Cited

U.S. PATENT DOCUMENTS

| | | |
|---|---|---|
| 7,024,491 B1 | 4/2006 | Hanmann |
| 8,825,597 B1 | 9/2014 | Houston |
| 2003/0046415 A1 | 3/2003 | Kaijyu |
| 2003/0074323 A1 | 4/2003 | Catan |
| 2003/0229899 A1 | 12/2003 | Thompson |
| 2005/0033760 A1 | 2/2005 | Fuller |
| 2007/0186106 A1 | 8/2007 | Ting |
| 2007/0226368 A1 | 9/2007 | Strickland |
| 2008/0005195 A1* | 1/2008 | Li ................... G06F 17/30174 |
| 2009/0157802 A1 | 6/2009 | Kang |
| 2010/0057892 A1 | 3/2010 | Han |
| 2010/0057924 A1 | 3/2010 | Rauber |
| 2010/0113072 A1* | 5/2010 | Gibson ............... G06Q 20/045 455/466 |
| 2011/0218963 A1* | 9/2011 | Dun .................. G06F 17/30575 707/625 |
| 2012/0310880 A1* | 12/2012 | Giampaolo ....... G06F 17/30545 707/610 |
| 2014/0032759 A1 | 1/2014 | Barton |
| 2014/0059185 A1* | 2/2014 | Siripurapu ........ G06F 17/30864 709/219 |

(Continued)

OTHER PUBLICATIONS

EMC Corporation—White Paper. "Secure, Enterprise File Sync and Share with EMC Syncplicity Utilizing EMC Isilon, EMC Atmos, and EMC VNX". Aug. 2014.

*Primary Examiner* — Etienne P Leroux
(74) *Attorney, Agent, or Firm* — Van Pelt, Yi & James LLP

(57) ABSTRACT

Techniques to synchronize data across a plurality of endpoints are disclosed. An indication that data associated with a file or other object included in a synchronization set has been changed is received from a first synchronization endpoint associated with the synchronization set. A synchronization event that reflects the change is created and added to a synchronization event stream that is accessible to a second endpoint associated with the synchronization set.

19 Claims, 8 Drawing Sheets

(56) References Cited

U.S. PATENT DOCUMENTS

| | | |
|---|---|---|
| 2014/0067997 A1 | 3/2014 | Saabas |
| 2014/0195485 A1 | 7/2014 | Dorman |
| 2014/0287818 A1 | 9/2014 | Chan |
| 2015/0120662 A1 | 4/2015 | Dai |
| 2015/0339727 A1 | 11/2015 | Yi |
| 2016/0294916 A1 | 10/2016 | Daher |

* cited by examiner

600

| Event # | Object | Event type | Time | Client | Event details |
|---|---|---|---|---|---|
| 1 | | | | | |
| 2 | | | | | |
| 3 | | | | | |
| 4 | | | | | |
| 5 | | | | | |
| ⋮ | | | | | |
| $n$ | | | | | |

FIG. 6

EVENT-BASED SYNCHRONIZATION IN A FILE SHARING ENVIRONMENT

BACKGROUND OF THE INVENTION

File sharing systems and services have been provided to maintain synchronization among a plurality of endpoints at which a synchronized folder and/or its contents (e.g., files) may be stored. Synchronization has been performed via processing done primarily on the server side, enabling synchronization to be provided across disparate client devices and systems using relatively minimal client side software.

For example, in prior approaches, when an opportunity to synchronize a folder or other synchronization set as stored on a client device or system arose, e.g., the client checked in with a synchronization server, the server would determine which changes made elsewhere needed to be applied to the client device or system. However, at scale, such a server centric approach would strain server side resources, particularly for large synchronization sets and/or for systems that must synchronize a large number of synchronization sets of files (e.g., folders) across many client devices/systems and/or end users. The approach was also too restrictive, unable to take advantage of client-side context unavailable to the server at the time the synchronization calculation was performed.

BRIEF DESCRIPTION OF THE DRAWINGS

Various embodiments of the invention are disclosed in the following detailed description and the accompanying drawings.

FIG. 6 is a block diagram illustrating an example of a data structure to store a synchronization event stream in an embodiment of a file sharing system.

DETAILED DESCRIPTION

Figure 1:
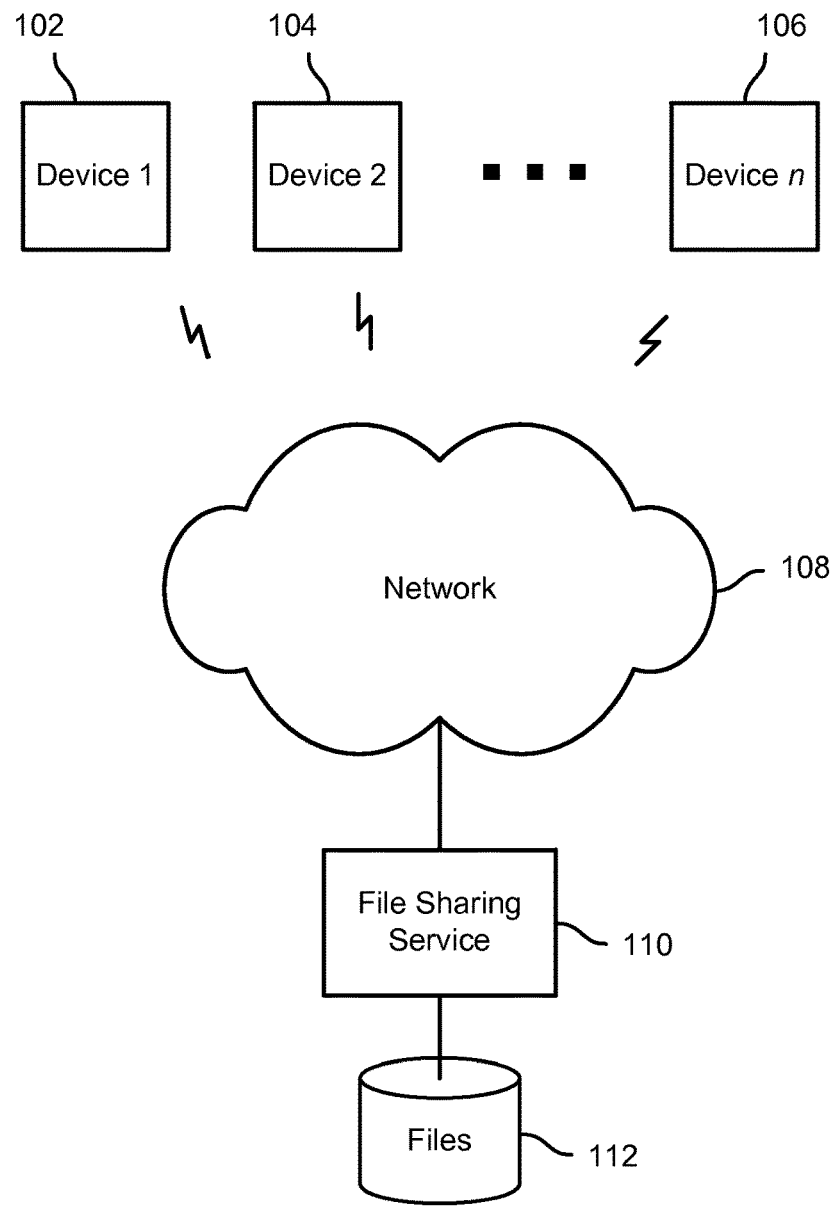
FIG. 1 is a block diagram illustrating an example embodiment of a file syncing and sharing system and associated client devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Event-based synchronization of objects stored in a multi-master, non-transaction file management system is disclosed. In various embodiments, an independently modifiable master copy of a file management system object (e.g., a file or folder) associated with a synchronization point (e.g., a top-level folder) may be stored and maintained at each of a plurality of endpoints associated with the synchronization point. For example, in some embodiments a master copy of each object may be stored at each of one or more on site or off premises client systems and/or devices associated with each of one or more users with which the synchronization point is associated. In various embodiments, a client application and/or other (e.g., browser executable) client side code at each respective endpoint is configured to maintain the copy of each synchronization point object as stored at that endpoint in synchronization with corresponding copies as stored at other endpoints associated with the synchronization point.

In various embodiments, a central/remote synchronization server tracks changes inside synchronization points as made at respective synchronization endpoints and which are required to be propagated to other endpoints, and generates a stream of synchronization events associated with the synchronization point. Client code running on the respective endpoints associated with the synchronization points is configured to check the synchronization event stream, e.g., periodically, opportunistically, in response to events generated by the server, as configured, etc., and to download synchronization events that require synchronization processing to be performed with respect to synchronization point objects as stored at that endpoint.

FIG. 1 is a block diagram illustrating an example embodiment of a file syncing and sharing system and associated client devices. In the example shown, a plurality of client devices, represented in FIG. 1 by devices 102, 104, and 106, connect via a network 108 to a file sharing service 110 configured to provide managed access, via share operations defined by users, to files stored in a file storage system and/or device 112. In some embodiments, client devices such as devices 102, 104, and 106 each have installed thereon a client application or other client side code configured to provide access to services provided by the file sharing service 110. Examples of such services may include, in various embodiments, operations to share a file and/or folder with one or more other specific users and/or groups of users, and operations to view and/or access files and folders that have been shared by other users with a user of the mobile device. In some embodiments, file sharing service 110 comprises the EMC® Syncplicity® file sharing service.

Figure 2:
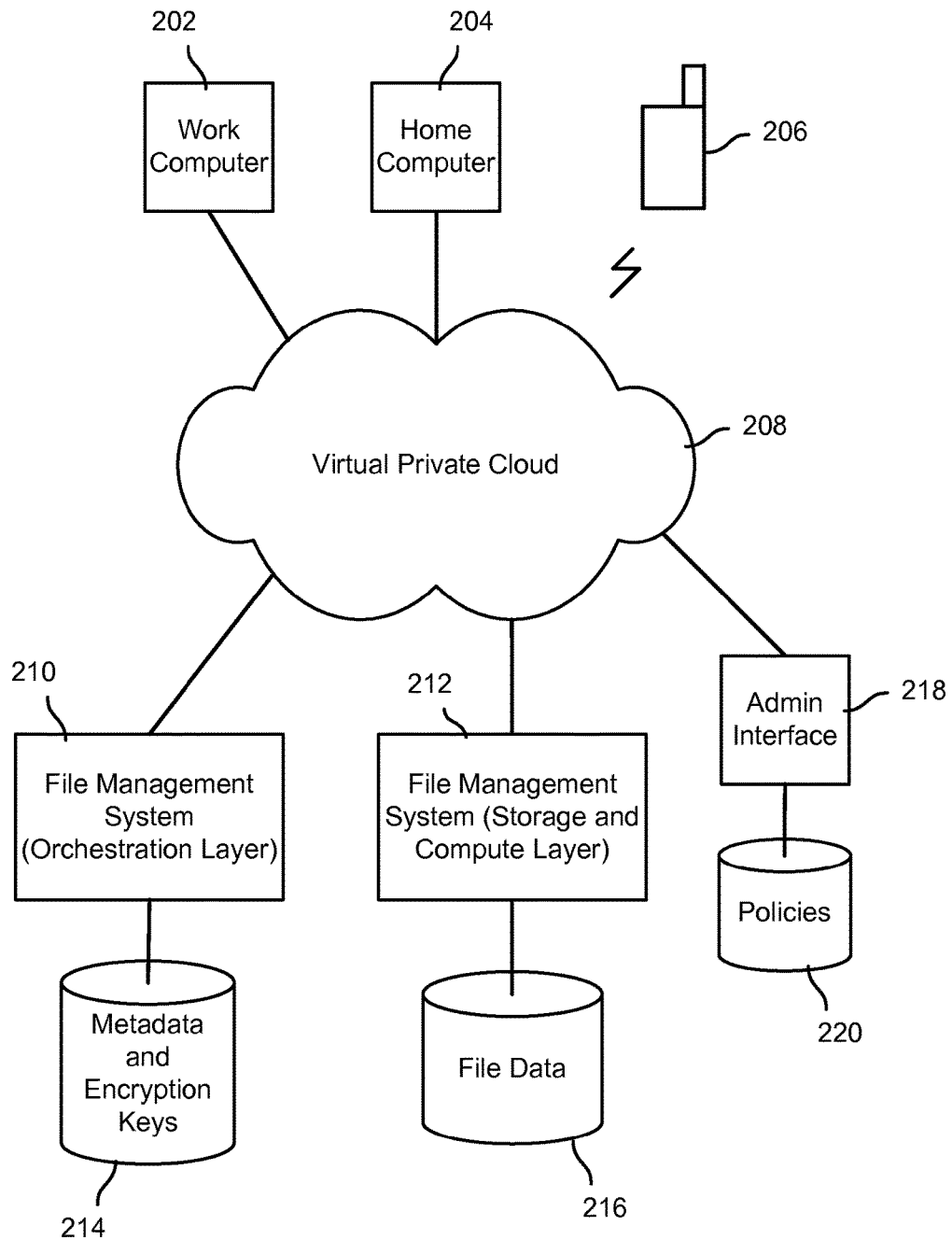
FIG. 2 is a block diagram illustrating an embodiment of a file management system.

FIG. 2 is a block diagram illustrating an embodiment of a file management system. In the example shown, content that is created, modified, deleted, etc. by one or more users of computers 102 and 104 and mobile device 106 is managed as part of a virtual private cloud 208 by a file management system that includes an orchestration layer 210 and a storage and compute layer 212. In various embodiments, a synchronization point instance may be created to manage files across disparate storage systems, including without limitation the computers 102 and 104, mobile device 106, as well as file servers and web/cloud based solutions. The orchestration layer 210 uses metadata stored and (optionally) encryption keys stored in a metadata and encryption key store 214 to manage files included in a synchronization point. Files are stored and managed "in place" at the various endpoints at which the user(s) of the synchronization point have configured them to reside. Each endpoint has a master copy of each file it is configured to store, and the locally stored file is synchronized to propagate to other endpoints changes that are made to the local copy and to update the local copy to reflect changes made at other endpoints. At file creation and/or as updates are made at various endpoints, file content data and/or changes thereto are uploaded to the storage and compute layer 212, which performs bulk data transfers and storage, and associated processing such as encryption and compression. Storage and compute layer 212 stores file data in a file data store 216, which in some embodiments may include any backend storage suitable to store large amounts of data. Using an administrative interface 218, such as a web-based interface, IT administrators can define and store in a policy store 220, and to configure the file management system to apply and enforce, file management policies, including in various embodiments and without limitation one or more of retention policies, access restrictions (e.g., restricting access to enterprise data and/or selected data depending on user/device location), security policies to limit sharing to authorized enterprise users, etc.

Figure 3:
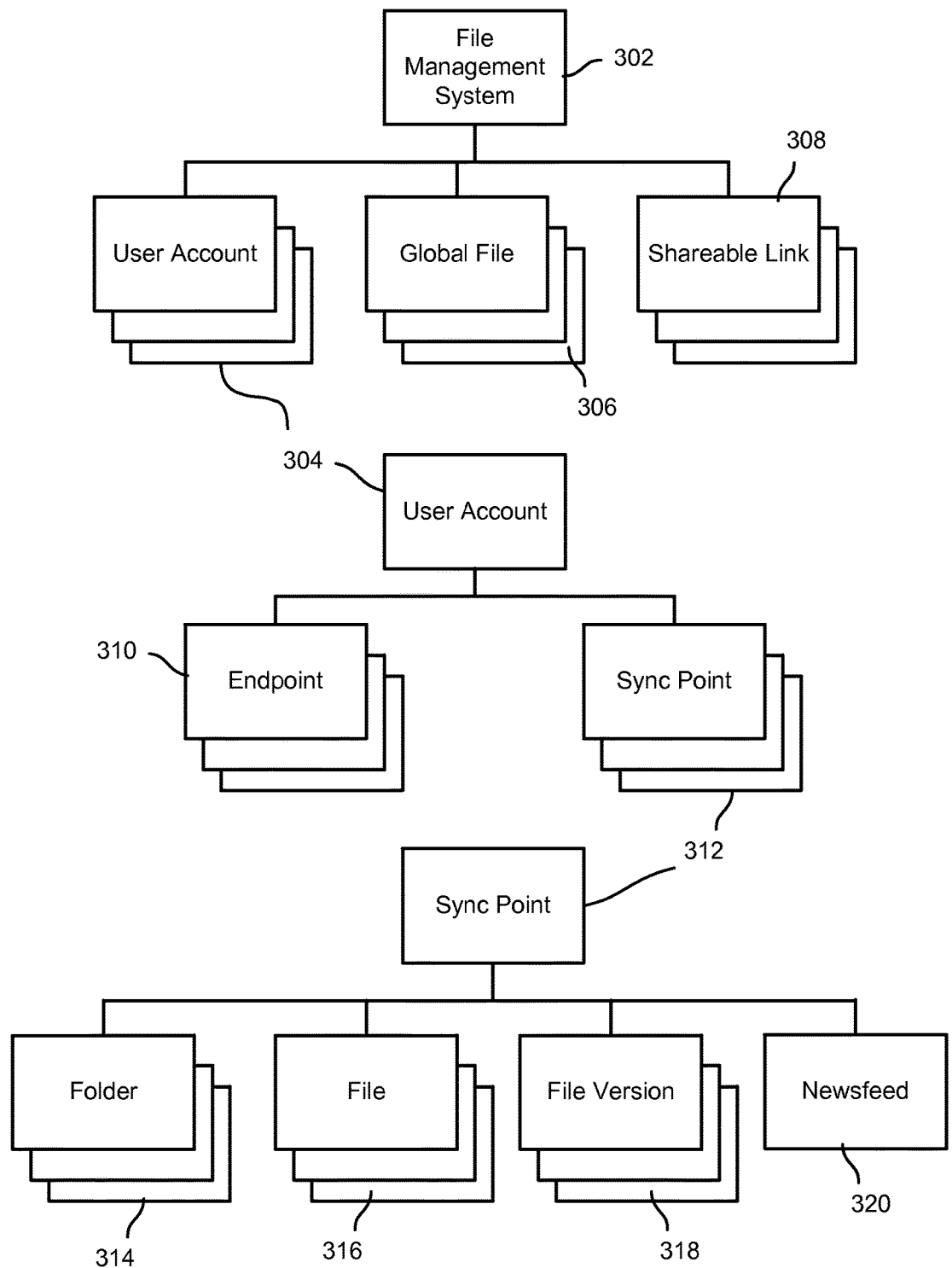
FIG. 3 is a block diagram illustrating an embodiment of a set of data structures representing entities comprising a synchronized file management system.

FIG. 3 is a block diagram illustrating an embodiment of a set of data structures representing entities comprising a synchronized file management system. In the example shown, the file management system 302 may include a plurality of user accounts 304, a plurality of global files 306, and a plurality of shareable links 308. Each user account 304 may have associated therewith one or more endpoints 310 and one or more synchronization points 312. In some embodiments, shareable lines 308 may be associated with user accounts 304. Each synchronization point 312 may include one or more folders (or subfolders) 314, a plurality of files 316, each file having one or more file versions 318, and/or a newsfeed 320 to propagate events and other information among nodes included in the synchronization point instance. In various embodiments, tables or other data structures may be created and stored to track and manage data values representing the entities shown in FIG. 3.

Event-based synchronization of objects stored in a multi-master, non-transaction file management system is disclosed. In various embodiments, a synchronization server propagates file management system object changes to endpoints associated with a synchronization point (e.g., a shared folder) with which the changed object is associated at least in part by generating and maintaining synchronization event stream. Client code running on the respective endpoints is configured to check the synchronization event stream and to use information in events comprising the stream to synchronize files, folders, and metadata as stored on the endpoint as required to become and remain synchronized with the global/authoritative state of the objects and metadata comprising the synchronization point.

Figure 4:
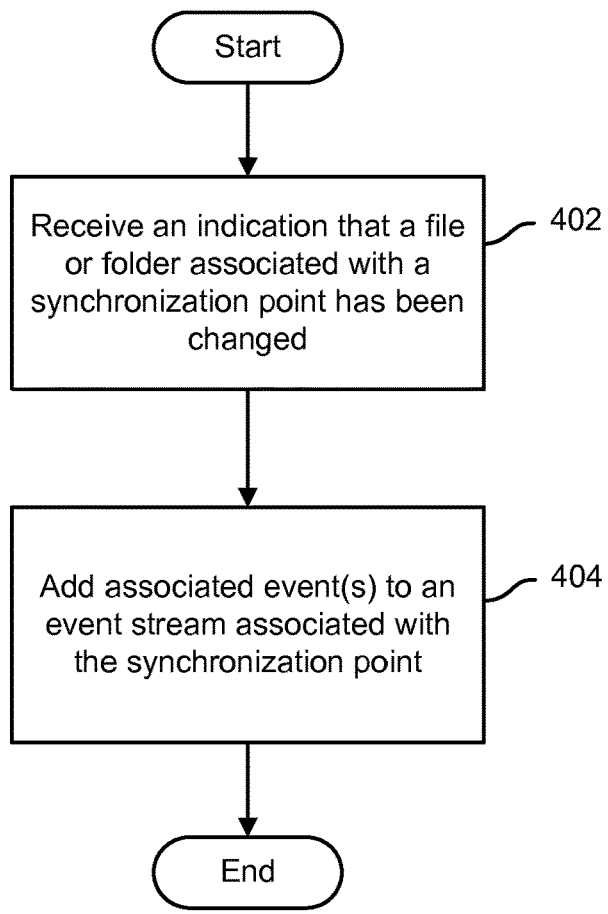
FIG. 4 is a flow chart illustrating an embodiment of a process to provide an event stream associated with a synchronization point.

FIG. 4 is a flow chart illustrating an embodiment of a process to provide an event stream associated with a synchronization point. In various embodiments, the process of FIG. 4 may be performed by a synchronization server, such as file syncing and sharing service 110 of FIG. 1 or file management system servers 210 and/or 212 of FIG. 2. In the example shown, an indication is received that a file or folder (or other object or information) associated with a synchronization point has been changed, e.g., at one of a plurality of endpoints (client systems and/or devices) associated with the synchronization point (402). For example, client code running on the endpoint may have provided the indication, e.g., in response to the object having been saved in modified form at the endpoint. A corresponding synchronization event is created and added to an event stream associated with the synchronization point (404). For example, a list, table, or other data structure may be updated to include the synchronization event. In various embodiments, synchronization events may be identified by a sequential number and/or other unique identifier, such as a monotonically increasing sequence number. In various embodiments, the event sequence numbers and/or other sequential identifiers may be used by client software to determine whether new events have been added to the event stream since that client last downloaded events, and if so which ones need to be downloaded by that client.

Figure 5:
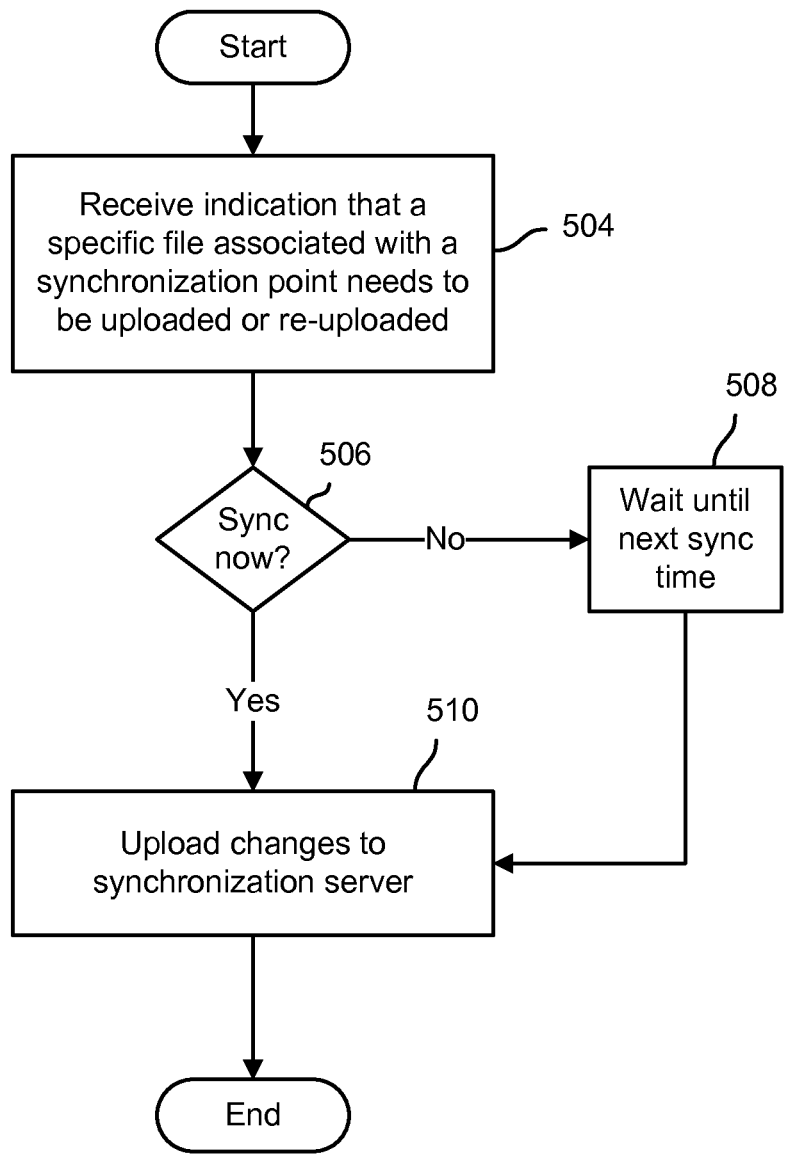
FIG. 5 is a flow chart illustrating an embodiment of a process to upload file system objects at an endpoint.

FIG. 5 is a flow chart illustrating an embodiment of a process to upload file system objects at an endpoint. In various embodiments, the process of FIG. 5 may be performed by client side code, such as a synchronization client application and/or script, running on a client system or device associated with a synchronization endpoint, such as devices 102, 104, 106 of FIG. 1 and/or clients 202, 204, 206 of FIG. 2. In some embodiments, client side execution of the process of FIG. 5 results in the indication of step 402 of FIG. 4 being received at the server side. In the example shown in FIG. 5, a server informs the client that a specific file, which is known to reside on the client device, needs to be uploaded (504). This can happen if, for example, the file was found to be corrupt on the server. If the client application/code is configured to immediately synchronize the file (506), and/or upon the next time and opportunity that the client side code is configured to synchronize files at the client (508), the files at the client are uploaded to the synchronization server (510).

FIG. 6 is a block diagram illustrating an example of a data structure to store a synchronization event stream in an embodiment of a file sharing system. In various embodiments, data structures such as the event stream table 600 of FIG. 6 may be used to store a synchronization event stream generated and maintained by a synchronization server, as in the process of FIG. 4. In the example shown, synchronization event stream table 600 includes for each sequentially numbered synchronization event in the stream a corresponding row in which the following data values are stored, each in a corresponding column of table 600: event sequence number; object (e.g., file) affected; event type (e.g., file contents modified, file/folder name changed, etc.); a time associated with the event (e.g., when the change occurred, was reported, and/or associated event was added to the stream); a client device/system/endpoint with which the event is associated (e.g., endpoint at which change was made and/or from which change was reported); and event details (e.g., name-value pairs for modified attributes, pointers to object content data as modified, etc.).

In various embodiments, a client code running on an endpoint may be configured to use data stored in synchronization event stream table 600, as stored at the synchronization server, to determine whether events have been added since a last time the client downloaded events, and if so which ones. For example, a synchronization client may query the synchronization server to determine a last used (added) event sequence number. If the number is greater than the last event sequence number processed by the client, in some embodiments the client may submit additional queries to determine which, if any, of the newly-added events should be requested for download by and to that client.

Figure 7:
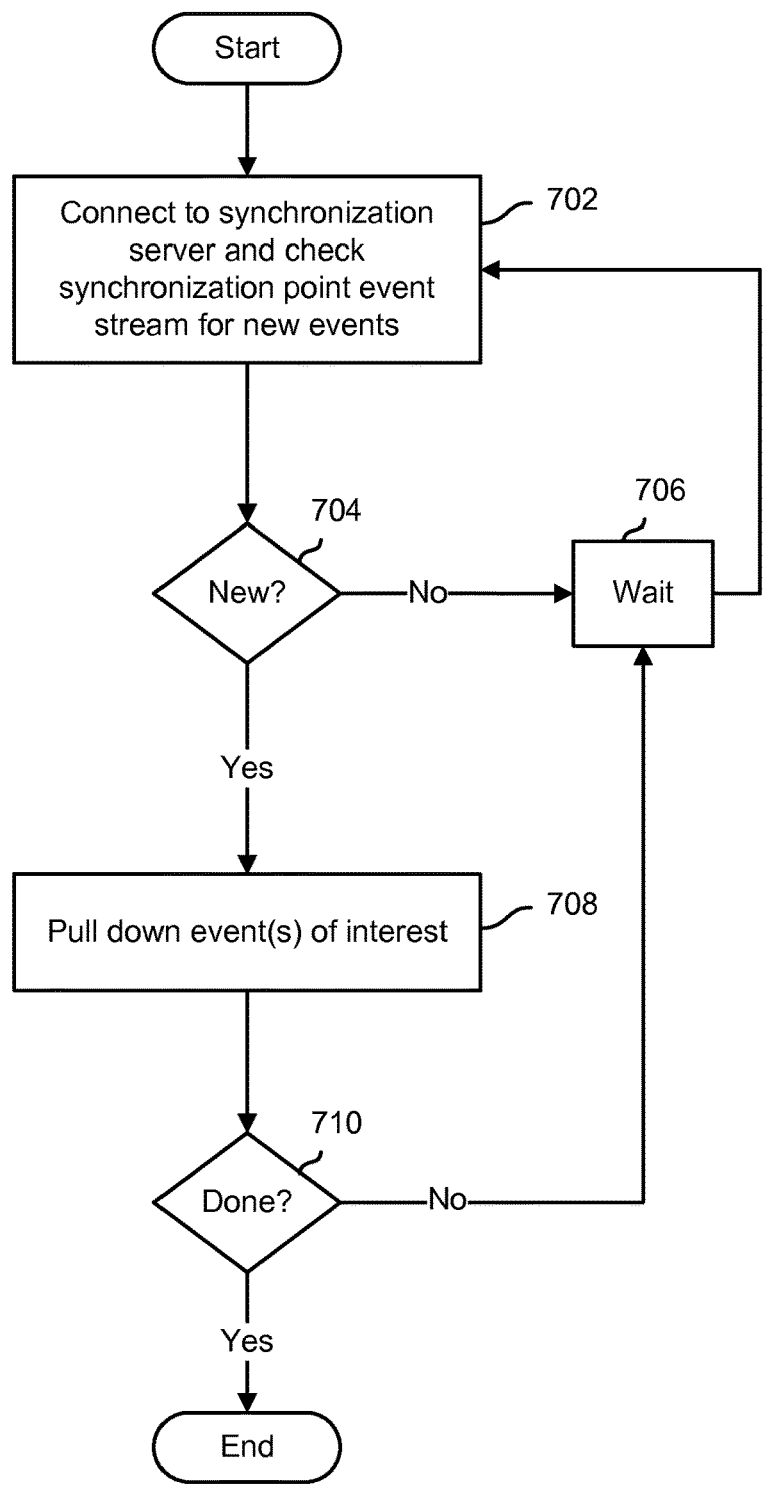
FIG. 7 is a flow chart illustrating an embodiment of a process to download synchronization events to an endpoint.

FIG. 7 is a flow chart illustrating an embodiment of a process to download synchronization events to an endpoint. In various embodiments, a synchronization client application or other client side synchronization code may be configured to perform the process of FIG. 7, e.g., client code running on client systems and/or devices, such as devices 102, 104, 106 of FIG. 1 and/or clients 202, 204, 206 of FIG. 2. In the example shown, the client side code connects to the synchronization server and checks to determine if the synchronization event stream associated with a synchronization point with respect to which the client is a participating endpoint includes any synchronization events that were added since a last time the client checked for and/or downloaded events in the stream (702). If there are no new events (704), the client waits a prescribed interval (e.g., admin user configurable, hard coded, dynamically determined based on conditions, location, etc.) (706) and checks again (702). If there are events in the synchronization event stream that the client has not yet downloaded (704), the client identifies and pulls down (e.g., requests from the server) events of interest to that client (708). For example, the client may request only a subset of events relating to synchronization point objects with respect to which the client has been configured to maintain synchronization. Once new events have been downloaded (710), the client will wait a prescribed interval and/or for occurrence of a prescribed event (706) before checking again (702). The process continues until done (710), e.g., the client is no longer an endpoint participating in the synchronization point.

Figure 8:
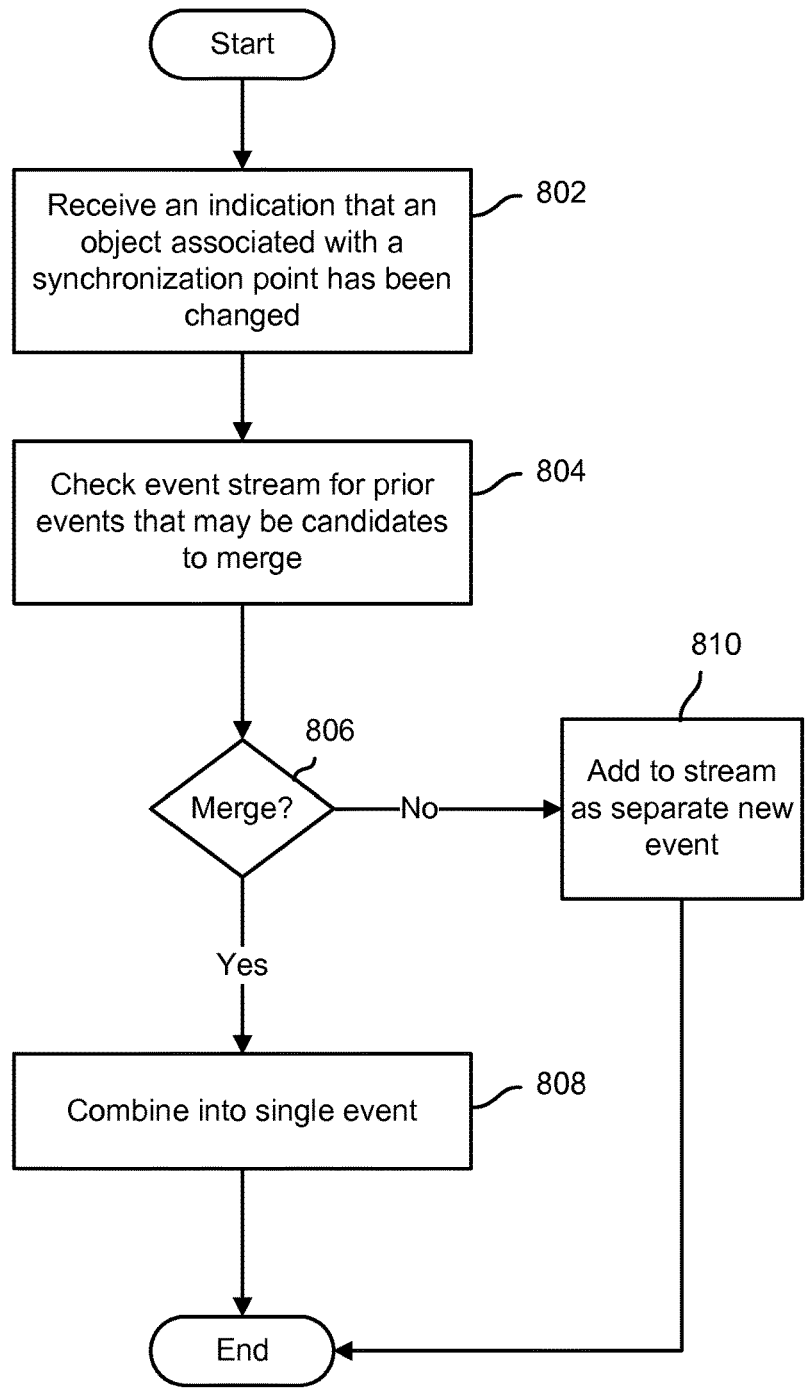
FIG. 8 is a flow chart illustrating an embodiment of a process to manage a synchronization event stream.

FIG. 8 is a flow chart illustrating an embodiment of a process to manage a synchronization event stream. In various embodiments, the process of FIG. 8 may be performed by a synchronization server, such as file sharing service 110 of FIG. 1 or file management system servers 210 and/or 212 of FIG. 2. In the example shown, an indication is received that an object (or metadata) associated with a synchronization point has been changed (802). For example, a client participating in the synchronization point as an endpoint may have reported a change made at the client (see, e.g., the process of FIG. 5). An associated synchronization point event stream is checked to determine whether there are any existing events in the stream that may be candidates to be merged with the information concerning the object that has been changed (804). For example, in some embodiments, a count may be maintained of how many times an event in the event stream has been downloaded. If an event associated with a prior change to the same object remains in the queue and has not been downloaded by any endpoint, in some embodiments the earlier event may be considered a candidate for merger (804). In some embodiments, a change that would overwrite a change indicated in an event added previously to the stream, e.g., an event associated with a change to a file or folder name, may be superseded by the later change, even if some clients (endpoints) have already downloaded the earlier event. In some embodiments, in such a case the early event may be merged with the later change. For example, the earlier event may be removed from the event stream and a new event added to reflect the name or other attribute as changed most recently. If it is determined that the merger candidate event and the newly changed data can be merged (806), the information from the original event and the more recently indicated change are merged and reflected in a single event in the stream (808). If no candidate is found or merger is determined to not be indicated (806), the received change (802) is reflected in a separate event that is created and added to the synchronization event stream (810).

In various embodiments, techniques disclosed herein may be used to maintain synchronization in a multi-master, non-transactional file sharing/synchronization/management system. The approach may enable the system to operate more efficiently at scale, by using client systems and devices to identify information required to be downloaded to that client from the synchronization server, allowing more resources of the synchronization server to be used to receive and process uploaded changes, for example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of synchronizing data, comprising:

receiving, by one or more processors associated with a synchronization server, from a first synchronization endpoint associated with a synchronization set an indication that data associated with a file or other object comprising the synchronization set has been changed;

creating, by the one or more processors associated with the synchronization server, and adding to a synchronization event stream that is accessible to one or more second endpoints associated with the synchronization set a synchronization event that reflects the change; and propagating, by the one or more processors associated with the synchronization server, a change in the data associated with a file or other object comprising the synchronization set to the one or more second endpoints via one or more networks, the propagating the change comprising:

receiving, by the one or more processors associated with the synchronization server, a request for information associated with an update to the synchronization stream, wherein the request for information associated with an update to the synchronization stream is communicated to the synchronization server by the-one or more second endpoints; and providing, by the one or more processors associated with the synchronization server, at least a part of the synchronization event stream to the one or more second endpoints in response to the request for information associated with an update to the synchronization stream, wherein the synchronization event stream is used in connection with a determination of whether the changed data can be merged with an existing synchronization event that is already present in the event stream.

2. The method of claim 1, wherein the first synchronization endpoint comprises a first synchronization client.

3. The method of claim 2, wherein the one or more second endpoints comprises a second synchronization client, and wherein the synchronization event is created and added to the synchronization event stream at a synchronization server to which the first synchronization client and the second synchronization client have access.

4. The method of claim 1, wherein the changed data comprises file content data.

5. The method of claim 1, wherein the changed data comprises metadata.

6. The method of claim 1, wherein the synchronization event stream is accessible to the one or more second endpoints via a network connection to a synchronization server configured to respond to queries from the second endpoint with respect to the synchronization event stream.

7. The method of claim 6, wherein the one or more second endpoints are configured to query the synchronization server to determine whether the synchronization event stream includes any events that have not yet been downloaded to the one or more second endpoints.

8. The method of claim 7, wherein the query is based at least in part on an event sequence number.

9. The method of claim 7, wherein the one or more second endpoints are configured to request download of one or more events that have not yet been downloaded to the one or more second endpoints.

10. A system to synchronize data, comprising:
a communication interface; and
one or more processors associated with a synchronization server coupled to the communication interface and configured to:
receive from a first synchronization endpoint associated with a synchronization set, via the communication interface, an indication that data associated with a file or other object comprising the synchronization set has been changed;
create and add to a synchronization event stream that is accessible to one or more second endpoints associated with the synchronization set a synchronization event that reflects the change; and
propagate a change in the data associated with a file or other object comprising the synchronization set to the one or more second endpoints via one or more networks, wherein propagating the change comprises:
receive a request for information associated with an update to the synchronization stream, wherein the request for information associated with an update to the synchronization stream is communicated to the synchronization server by the one or more second endpoints; and
provide at least a part of the synchronization event stream to the one or more second endpoints in response to the request for information associated with an update to the synchronization stream, wherein the synchronization event stream is used in connection with a determination of whether the changed data can be merged with an existing synchronization event that is already present in the event stream.

11. The system of claim 10, wherein the first synchronization endpoint comprises a first synchronization client.

12. The system of claim 11, wherein the one or more second endpoints comprises a second synchronization client, and wherein the synchronization event is created and added to the synchronization event stream at a synchronization server to which the first synchronization client and the second synchronization client have access.

13. The system of claim 10, wherein the changed data comprises file content data.

14. The system of claim 10, wherein the changed data comprises metadata.

15. The system of claim 10, wherein the synchronization event stream is accessible to the one or more second endpoints via a network connection to a synchronization server configured to respond to queries from the second endpoint with respect to the synchronization event stream.

16. The system of claim 15, wherein the one or more second endpoints are configured to query the synchronization server to determine whether the synchronization event stream includes any events that have not yet been downloaded to the one or more second endpoints.

17. The system of claim 16, wherein the query is based at least in part on an event sequence number.

18. The system of claim 16, wherein the one or more second endpoints are configured to request download of one or more events that have not yet been downloaded to the one or more second endpoints.

19. A computer program product to synchronize data, the computer program product being embodied in a non-transitory computer readable storage medium and comprising computer instructions for:
receiving, by a synchronization server, from a first synchronization endpoint associated with a synchronization set an indication that data associated with a file or other object comprising the synchronization set has been changed;
creating, by the synchronization server, and adding to a synchronization event stream that is accessible to a second endpoint associated with the synchronization set a synchronization event that reflects the change; and
propagating, by the synchronization server, a change in the data associated with a file or other object comprising the synchronization set to the one or more second endpoints via one or more networks, the propagating the change comprising:
receiving, by the synchronization server, a request for information associated with an update to the synchronization stream, wherein the request for information associated with an update to the synchronization stream is communicated to the synchronization server by the one or more second endpoints; and
providing, by the synchronization server, at least a part of the synchronization event stream to the second endpoint in response to the request for information associated with an update to the synchronization stream, wherein the synchronization event stream is used in connection with a determination of whether the changed data can be merged with an existing synchronization event that is already present in the event stream.

* * * * *